United States Patent
Paumier

(10) Patent No.: US 6,751,895 B2
(45) Date of Patent: Jun. 22, 2004

(54) VERTICAL UNDERGROUND STUMP GRINDING APPARATUS

(75) Inventor: James J. Paumier, North Canton, OH (US)

(73) Assignee: New River Equipment, North Canton, OH (US)

( * ) Notice: Subject to any disclaimer, the term of this patent is extended or adjusted under 35 U.S.C. 154(b) by 21 days.

(21) Appl. No.: 10/305,541

(22) Filed: Nov. 27, 2002

(65) Prior Publication Data

US 2004/0098885 A1 May 27, 2004

(51) Int. Cl.$^7$ ................................................ A01G 23/06
(52) U.S. Cl. ..................................... 37/302; 144/24.12
(58) Field of Search .......................... 37/301, 302, 188, 37/189; 144/24.12, 34.1, 334, 335; 299/39.4, 78; 241/101.72; 414/694, 685

(56) References Cited

U.S. PATENT DOCUMENTS

| | | |
|---|---|---|
| 1,012,962 A | 12/1911 | Anderson |
| 1,104,535 A | 7/1914 | Moore et al. |
| 1,164,659 A | 12/1915 | Moore et al. |
| 1,466,538 A | 8/1923 | McKoy et al. |
| 2,710,634 A | 6/1955 | O'Brien |
| 2,923,332 A | 2/1960 | Osmun |
| 3,818,957 A | 6/1974 | Schoonover |
| 4,637,442 A | 1/1987 | Mozer |
| 5,887,634 A | 3/1999 | Theisen |
| 6,435,234 B1 | 8/2002 | Paumier |

OTHER PUBLICATIONS ceattachmentsinc., 2002 Attachment Lineup Brochure 590797–0102, p. 19.
ceattachmenstsinc., Brochure 590791–0302, center page — No date.

Primary Examiner—Robert E. Pezzuto
(74) Attorney, Agent, or Firm—Brouse McDowell; Roger D. Emerson

(57) ABSTRACT

A vertical underground stump grinding apparatus having an elongated stump grinding tool rotatable about a vertical axis with cutting blades on the surface and a drilling end rotatably mounted on a vehicle such as a hydraulic excavator or skid steer loader which provide adequate power to rotate the tool and directional support to provide vertical movement into the ground adjacent the stump, transverse movement underground toward and in grinding engaged with the sides of the stump and removal by lifting out of the ground after the stump is ground away.

15 Claims, 8 Drawing Sheets

VERTICAL UNDERGROUND STUMP GRINDING APPARATUS

BACKGROUND OF THE INVENTION

A. Field of Invention

This invention relates to a method and apparatus for grinding stumps with an elongated grinding tool rotatable about a generally vertical axis. The tool is mounted on a supporting vehicle and may be self powered or the supporting vehicle may provide power for rotating the tool. Piston cylinder assemblies on the vehicle provide vertical movement of the grinding tool into and out of the ground adjacent the stump and horizontal movement along the sides of the stump for grinding the stump.

B. Description of Related Art

Stump grinders of the type shown in applicant's U.S. Pat. No. 6,435,234 have disc cutters rotatable about a generally horizontal axis and are moved through the stump in a direction parallel with the axis of the cutter. This has the disadvantage of the drive shaft and bearings being below the ground level where they are exposed to dirt and rocks. Also, the debris which may include stones thrown out of the hole in the ground which constitutes a safety problem.

Another problem with disc cutter rotatable about a horizontal axis is that they require relatively large diameter disc cutters in order to grind deep enough to remove the roots of medium and large stumps. The large diameter disc cutters also require more power which cannot be supplied by small horsepower vehicles. The large diameter discs also may climb up on the stump being ground and upset the vehicle on which they are mounted.

Stump grinding tools rotatable about a vertical axis have been proposed as shown in U.S. Pat. Nos. 1,012,962 and 1,466,538 where the grinding tools are placed over the stump and grind it down to ground level. These patents including U.S. Pat. No. 3,818,957 which has a grinding tool rotatable about a vertical axis are directed to brush and tree cutting for land clearing and not to stump removal. Also, as stated in U.S. Pat. No. 3,818,957 "a shroud can be affixed to the outer portions of these elongate blades to retain dirt or earth removed by the blades at the sight"—This clearly indicates the grinding is done above the ground and not below the ground.

SUMMARY OF THE INVENTION

The present invention is directed to a stump grinder having an elongated grinding tool rotatable about a vertical axis for drilling into the ground adjacent a stump to a position below the ground and then moving horizontally into the sides of the stump where the debris and stones are thrown horizontally below the ground around the grinding tool. The debris which may be ejected above the ground is ground wood which does not constitute a serious hazard as do the stones which are located below the ground.

The grinder may be attached to equipment such as a skid steer vehicle, an articulated rubber tired vehicle or a hydraulic excavator which provide a source of adequate power including internal combustion engines, electric power or the addition of PTO power hydraulic drive power to rotate the grinding tool.

In accordance with one aspect of the invention there is provided a stump grinding apparatus comprising a grinding tool support member, an elongated grinding tool mounted on the support member for rotation about a generally vertical axis of rotation, power means mounted on the support member and connected to the grinding tool for rotating the grinding tool, cutting teeth mounted on a stump grinding surface of the grinding tool, means to lower the support member and drive the rotating grinding tool into the ground at a position adjacent the stump, means to move the supporting member in a generally horizontal direction towards the stump to urge the rotating grinding tool and the cutting teeth of the stump grinding surface into a side of the stump underground, means to oscillate and curl the supporting member to move the grinding tool stump grinding surface along the buried surfaces of the stump to grind away the stump, and means to raise the support member to remove the grinding tool from the ground.

In accordance with another aspect of the invention there is provided a method of grinding a tree stump underground with an elongated generally cylindrical rotatable grinding tool having cutting blades on the generally cylindrical stump grinding surface of the tool comprising supporting an upper end of the grinding tool on a supporting member for rotation about a vertical axis, rotating the grinding tool by power means connected to an upper end of the grinding tool, lowering the grinding tool into the ground at a position adjacent the stump for penetrating the ground to a depth adjacent the roots of the stump, moving the grinding tool towards the stump to engage the sides of the stump, traversing the grinding tool along the sides of the stump to grind away portions thereof, raising the grinding tool out of the ground after the stump is ground away and stopping rotation of the grinding tool.

DETAILED DESCRIPTION OF THE INVENTION

Figure 1:
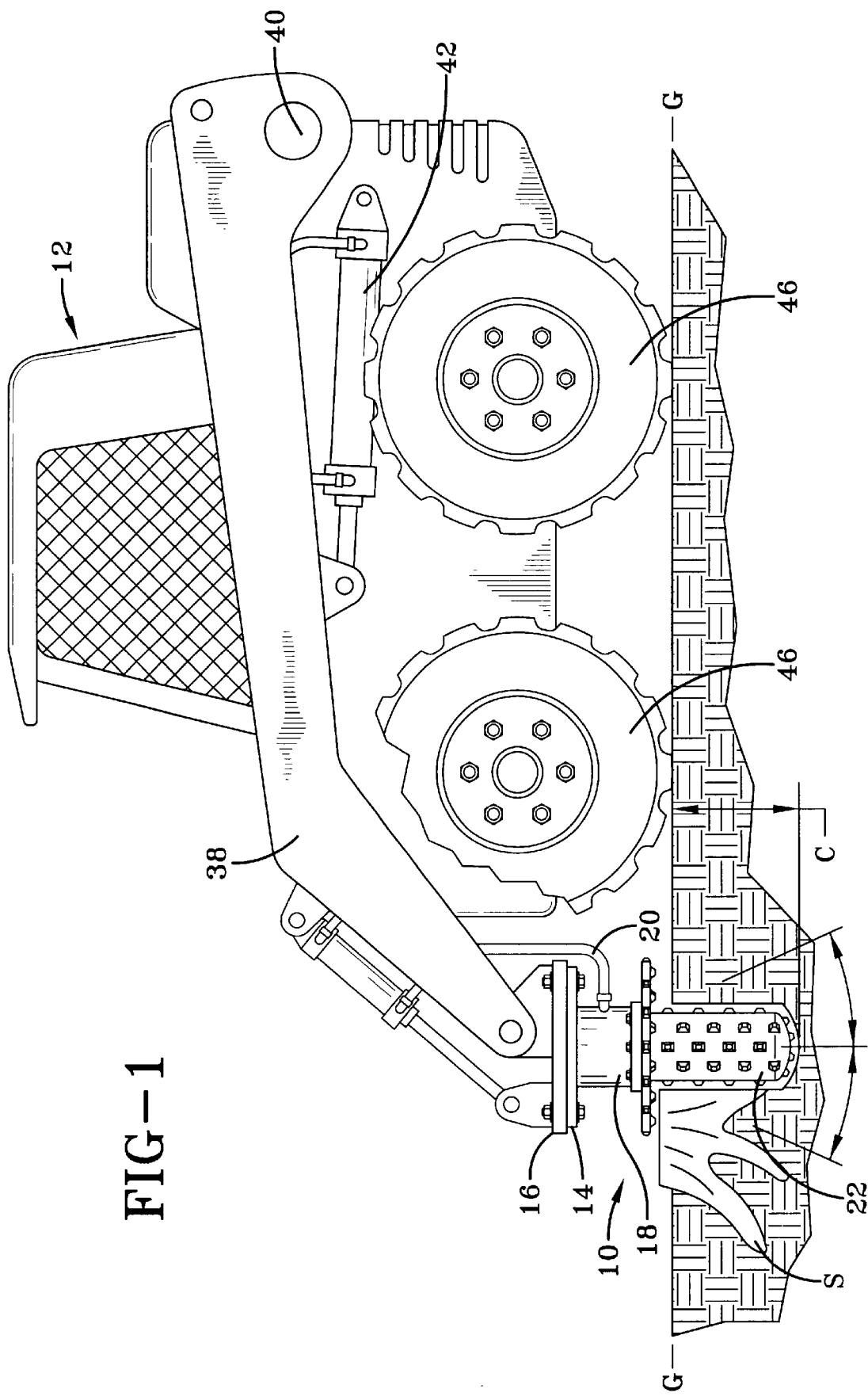
FIG. 1 is a side elevation of the stump grinding apparatus embodying the invention mounted on a skid steer vehicle showing the grinding tool in the underground operating position.
Figure 2:
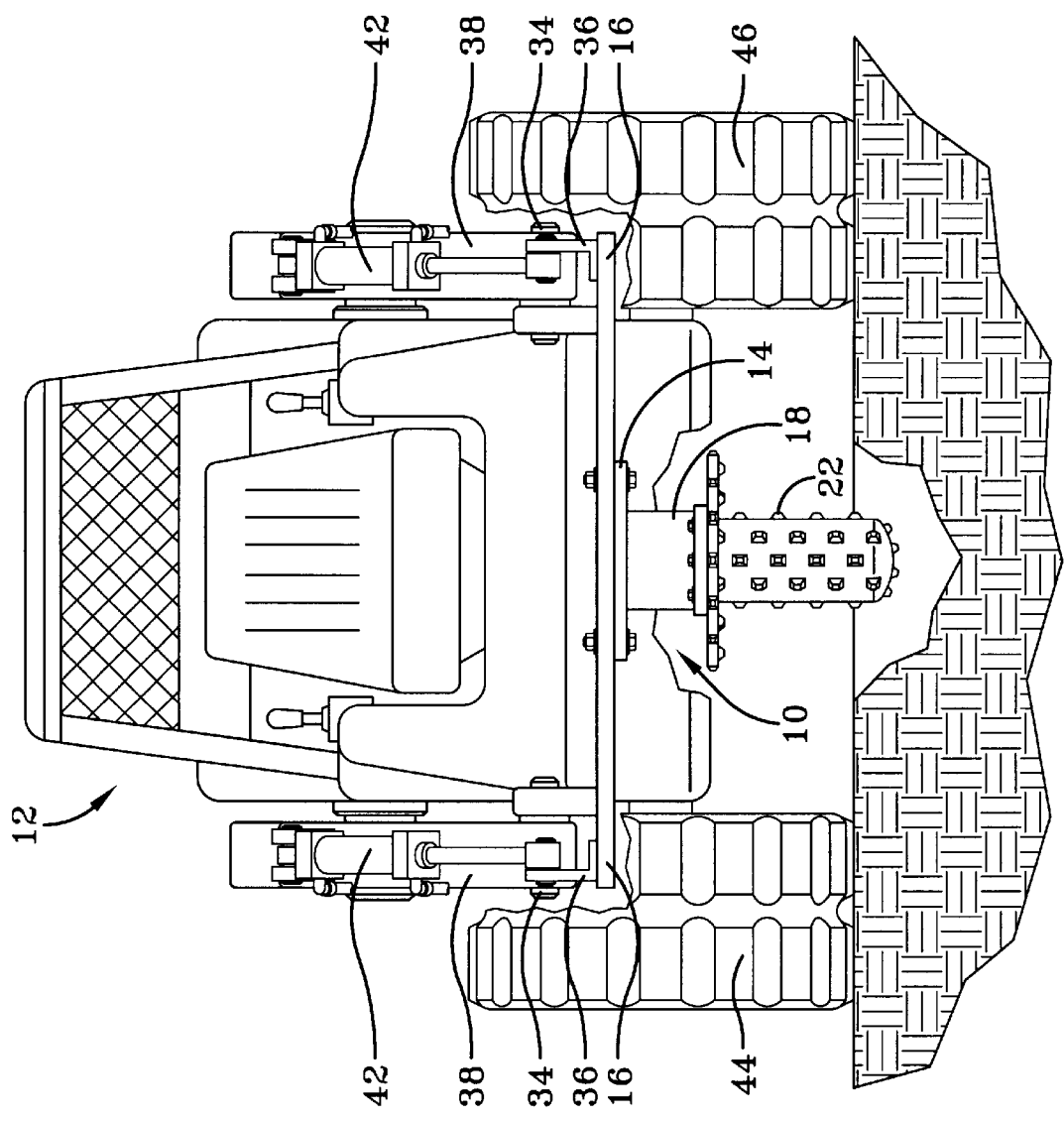
FIG. 2 is a front view of the stump grinding apparatus shown in FIG. 1 with the grinding tool in a partially raised position.
Figure 3:
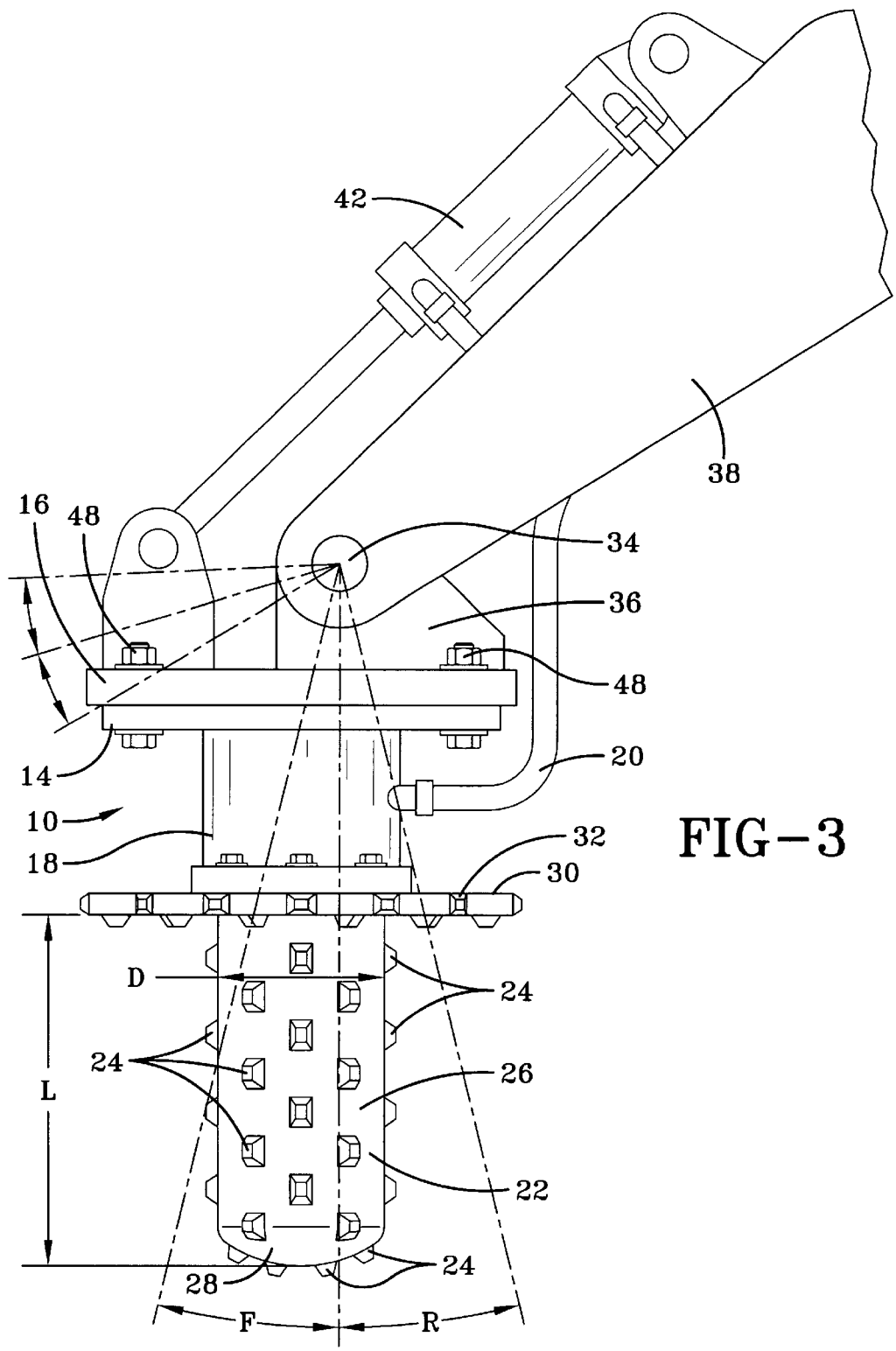
FIG. 3 is an enlarged fragmentary side elevation of the grinding tool shown in FIG. 1 illustrating the curling action of the tool provided by the bucket cylinder piston assembly.

Referring FIGS. 1, 2 and 3 a stump grinding apparatus 10 embodying the invention is shown mounted on a skid steer loader 12. The stump grinding apparatus has a support member or flange 14 mounted on a bucket beam 16 of the skid steer loader 12. The flange 14 may be for a hydraulic motor 18 having a hydraulic fluid pressure hose 20 connected to a hydraulic pump in the skid steer loader 12.

Mounted on the hydraulic motor 18 is an elongated grinding tool 22 which may be generally cylindrical as shown in FIG. 3 and have cutting teeth 24 mounted on a stump grinding surface 26 and a bottom drilling surface 28. A cutter plate 30 may be mounted at the top of the grinding tool 22 and extend outwardly from the grinding tool with top plate cutting teeth 32 extending outwardly from the edge of the top plate and below the edge.

The grinding tool 22 has a length "L" which is preferably equal to the depth of the stump "S" as shown in FIG. 1 this length may be from 24 inches to 36 inches (60.96 centimeters to 91.44 centimeters). Depending on the power available the diameter "D" of the grinding tool 22 may be from 8 inches to 18 inches (20.32 centimeters to 45.72 centimeters). This provides a "L/D" length divided by diameter ratio in the range of 1.33 to 4.50.

The hydraulic motor 18 is mounted on the bucket beam 16 for curling movement forward "F" and rearward "R" about pins 34 pivotally mounted on brackets 36 mounted on the bucket beam and extending between a bucket boom 38 at each side of the skid steer loader 12. The bucket booms 38 are pivotally mounted on each side of the skid steer loader 12 for rotation about pivotal bearings 40 which may be bearings of a suitable type. The bucket booms 38 are moveable about the bearings 40 in response to extension and retraction of piston cylinder assemblies 42 extending between the body of the skid steer loader 12 and the bucket booms 38 for raising and lowering the bucket booms with the grinding tool 22 from a raised position above a ground level "G—G" to an underground position "U" as shown in FIG. 1.

Mounted on each of the bucket booms 38,38 are bucket boom piston cylinder and piston assemblies 42 extending between the bucket booms 38 for tilting the grinding tool 22 in the forward "F" and rearward "R" directions.

The skid steer loader 12 has wheels 44 on one side and wheels 46 on the opposite side which are driven by hydraulic motors and can be rotated in opposite directions to swing the bucket beam 16 with the grinding tool 22 from side to side to provide transverse movement relative to the stump "S". Also by rotating the wheels 44,46 in the same direction the bucket beam 16 along with the grinding tool 22 can be moved forward into engagement with the stump "S".

Figure 6:
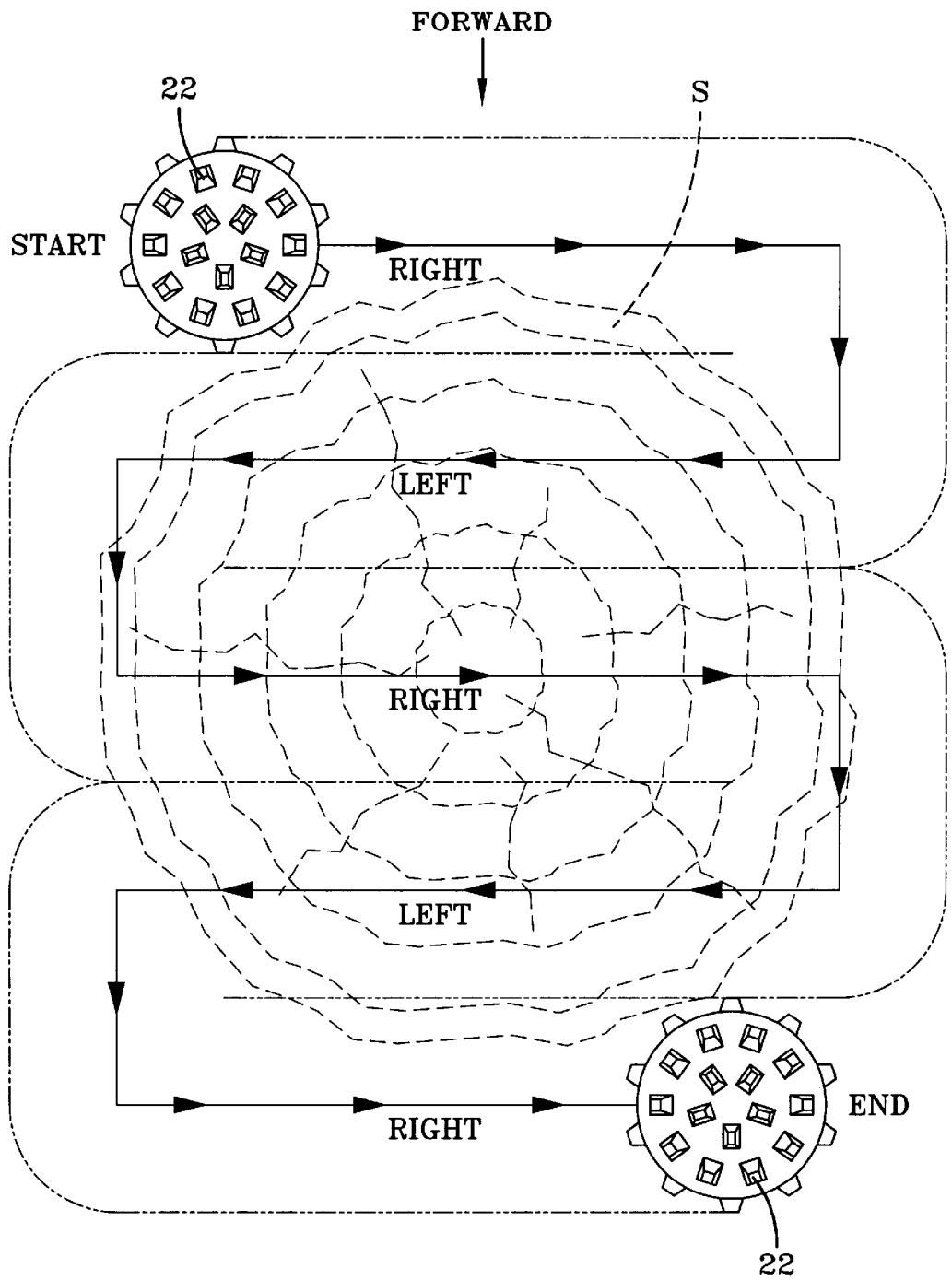
FIG. 6 is a schematic cross sectional view of the stump looking upward showing the cutting path of the grinding tool.

In operation the grinding tool 22 is mounted on the bucket beam 16 by fastening the flange 14 to the bucket beam by bolt fasteners such as nuts and bolts 48. The grinding tool 22 is lifted to a position spaced from the ground by actuating the bucket boom piston cylinder assemblies 42. A skid steer loader is then driven to a position with the grinding tool 22 positioned above the ground at a "start" position adjacent the root of the stump "S" as shown in FIG. 6. The grinding tool 22 is rotated by the hydraulic motor 18 and lowered for penetrating the ground to a depth adjacent the roots of the stump as shown in FIG. 1. The grinding tool 22 is then moved to the right by rotating the skid steer wheels 46 on one side in a forward direction and on the other side in a rearward direction to swing the bucket beam 16. Then the bucket beam piston cylinder assemblies 42 are actuated to swing the grinding tool 22 in a forward direction "F" as shown in FIG. 3 to further engage the stump "S". Next the grinding tool 22 is moved to the left by rotating the wheels 44 and 46 in opposite directions to swing the bucket beam 16 to the left as shown by the arrows in FIG. 6. This action is continued back and forth and forward until the stump "S" is ground away. If necessary the forward movement of the grinding tool 22 can be provided by rotating the wheels 44 on one side and the wheels 46 on the opposite side in the same direction. When the grinding tool 22 reaches the "END" position the stumps will have been ground away with the debris thrown into the ground. This is especially important in that the stones which are at the bottom of the stumps are not thrown out of the ground but into the ground. Normally the stump "S" is cut down to the ground level however with this grinding tool the wood from the stump which is at the top and is less likely to cause damage.

After the stump has been ground away the bucket boom piston cylinder assemblies 42 are actuated to raise the grinding tool 22 out of the ground and the apparatus 10 is ready to move to another location for grinding another stump.

Figure 4:
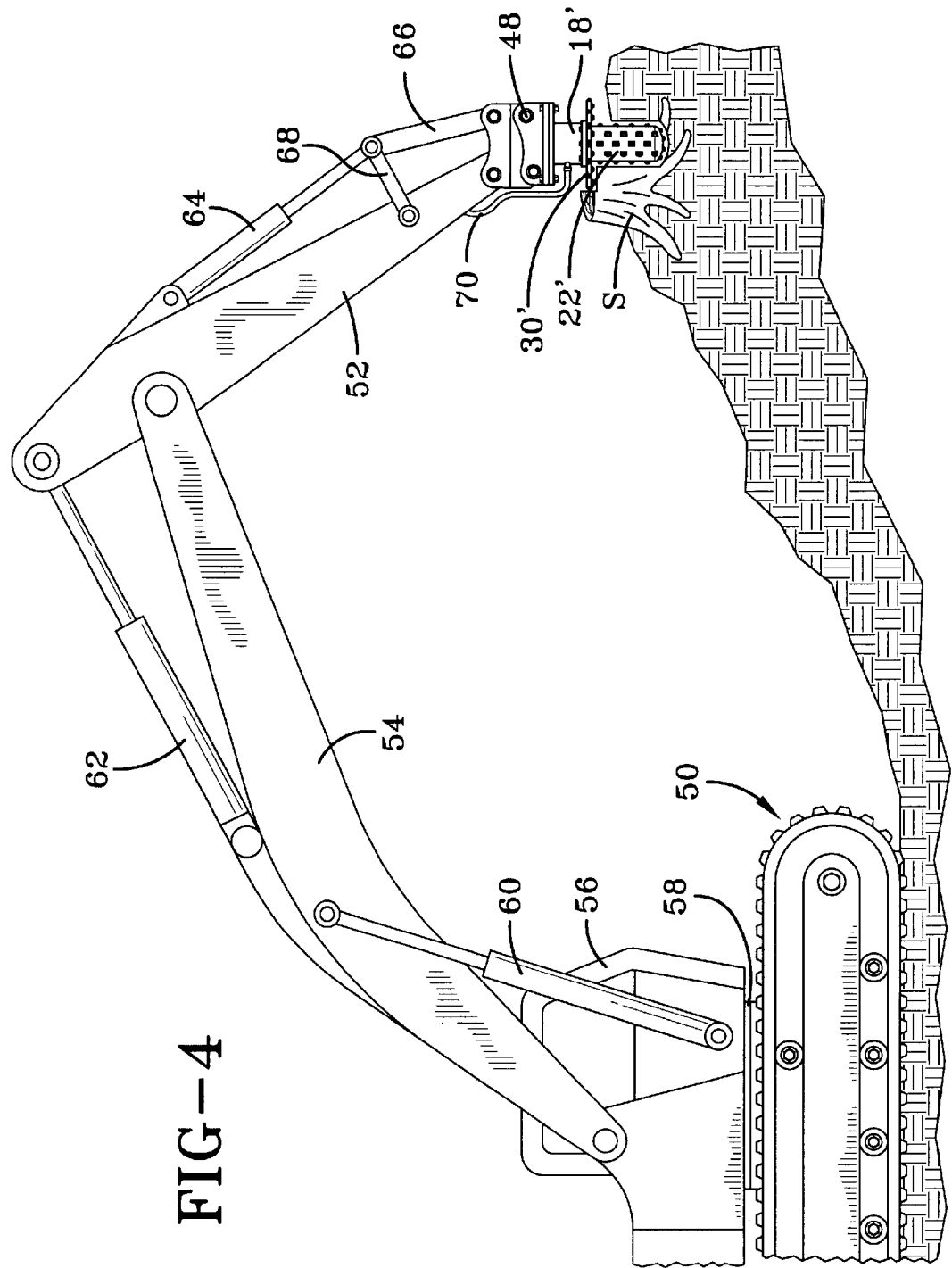
FIG. 4 is a side elevation of the stump grinding apparatus embodying the invention mounted on a hydraulic excavator showing the grinding tool in the underground operating position.
Figure 5:
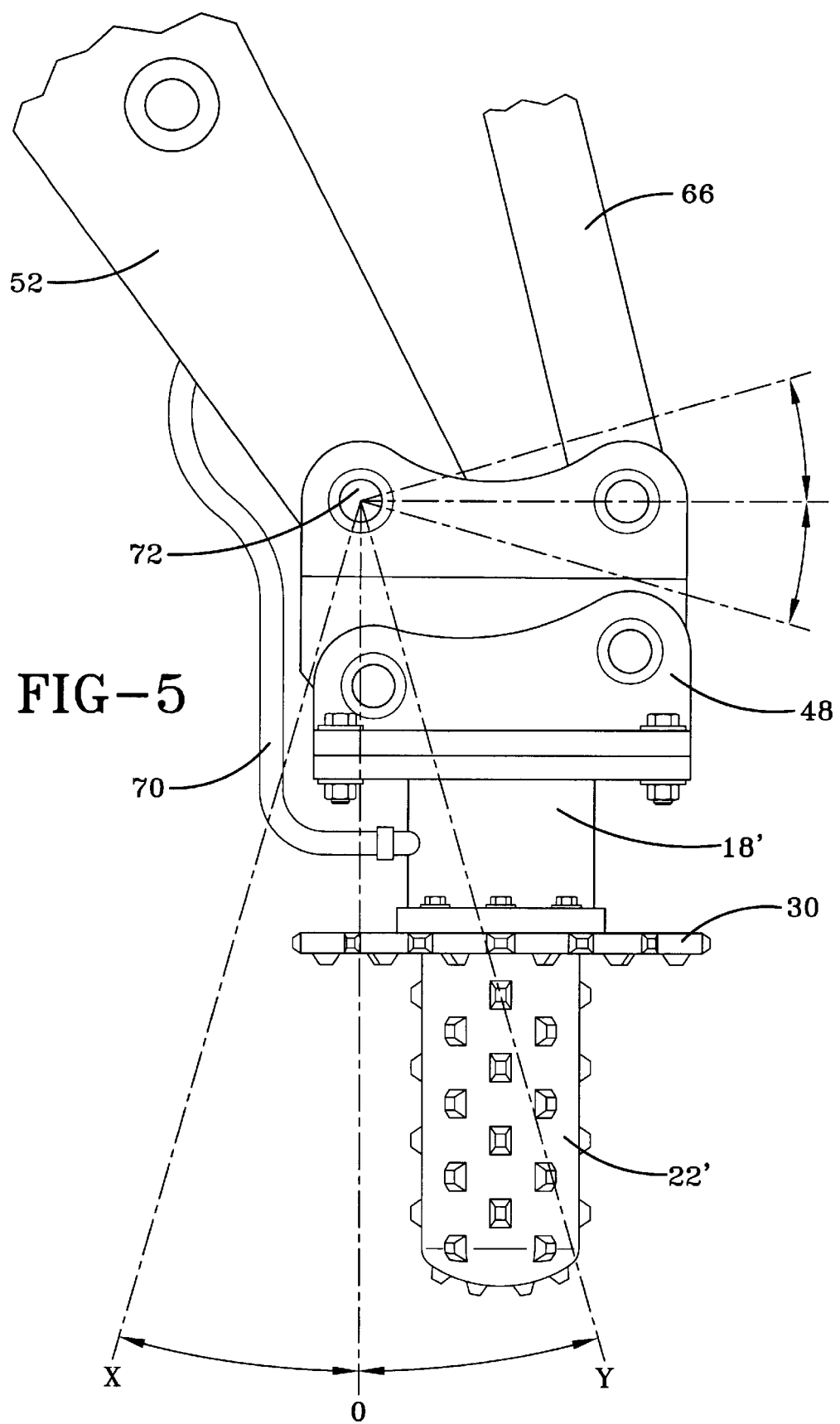
FIG. 5 is an enlarged fragmentary side elevation of the grinding tool shown in FIG. 4 illustrating the curling action of the tool provided by the link to the third hydraulic piston assembly mounted on the stick.

Referring to FIGS. 4 and 5 a modification is shown in which the grinding tool 22' is supported on the hydraulic motor 18' which is mounted on a quick coupling connection 48 of a hydraulic excavator 50. A quick coupling connection 48 is mounted rotatably on a stick 52 pivotally mounted on a boom 54 which in turn is pivotally mounted on a housing 56 supported on a platform 58. The platform 58 swings about a vertical axis to provide transverse movement of the cutting tool 22' into engagement with the stump "S". The boom 54 is moveable in a vertical direction by a first hydraulic piston cylinder assembly 60. The stick 52 moves the quick coupling connection 48 and the grinding tool 22' attached to it by a second hydraulic piston cylinder assembly 62. Curling action of the grinding tool 22' is provided by a third hydraulic piston cylinder assembly 64 attached to the quick coupling connection 48 through a link 66 pivotally mounted on a toggle arm 68 connected to the stick 52.

A hydraulic fluid pressure hose 70 in communication with a hydraulic pump in the excavator housing 56 provides power for rotating the grinding tool 22'.

In operation the excavator 50 is moved to a position near the stump "S" and the grinding tool 22' is moved to a position adjacent the stump "S" corresponding to the "start" position shown in FIG. 6. The grinding tool 22' is rotated by the hydraulic motor 18' and lowered to drill an opening in the ground next to the stump "S". This may be done by the first hydraulic piston cylinder assembly 60 lowering the boom 54. A grinding tool 22' may then be moved along the cutting path shown in FIG. 6 by rotating the platform 58 of the excavator in a first direction. The grinding tool 22' may then be moved to the second path by curling the tool 22' into the stumps through actuation of the third hydraulic piston cylinder assembly 64 causing the curling action about pivot pin 72. This curling action is shown schematically with the grinding tool being moveable from the position "O" to positions "X" and "Y" as shown in FIG. 5.

If necessary the grinding tool 22' may be moved with the quick coupling connection 48 into the stump "S" by actuating the second hydraulic piston cylinder assembly 62. When the stump "S" has been ground away the grinding tool 22' may be pulled out of the ground by actuating the first hydraulic piston cylinder assembly 60 causing the boom 54 to rotate in a counterclockwise direction as shown in FIG. 4.

Figure 7:
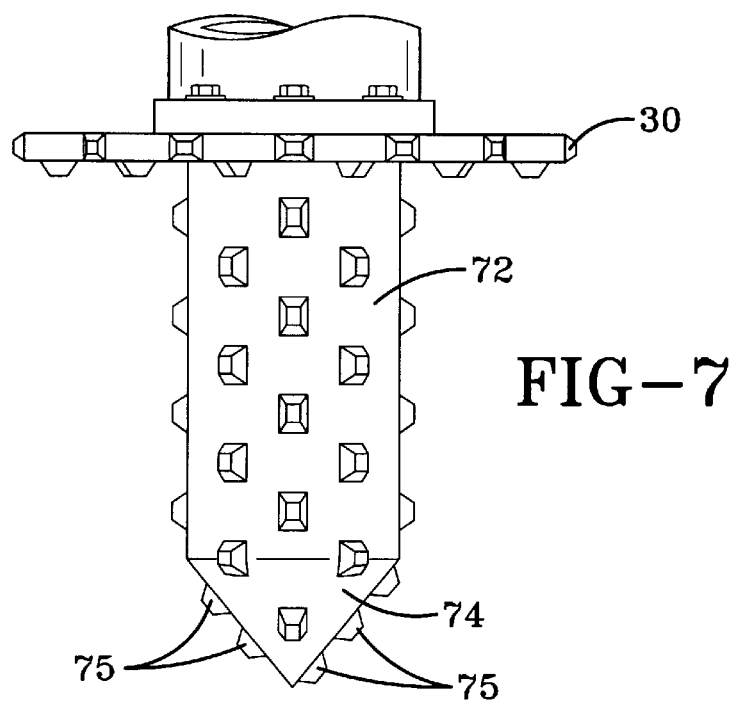
FIG. 7 is a side view of a grinding tool modification having a conical end and a cylindrical body.

Referring to FIG. 7 a modified grinding tool 72 which is cylindrical and has the same shape as the grinding tool 22 however a conical pointed end 74 having cutting teeth 75 is provided to facilitate drilling the grinding tool into the ground adjacent the stump "S".

Figure 8:
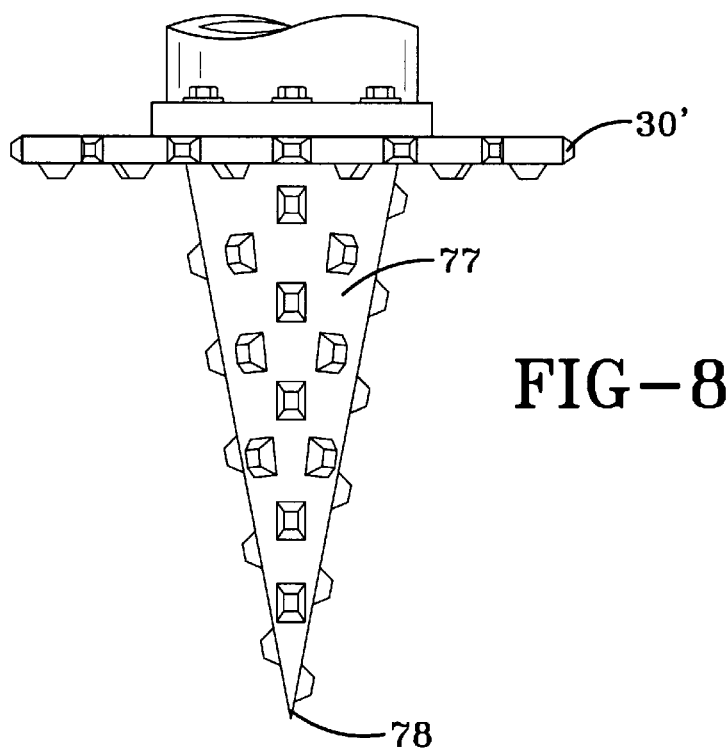
FIGS. 8–10 are side views of other grinding tool modification having various shapes.

A further modification is shown in FIG. 8 where a grinding tool 77 has a conical shape from the cutter top plate 30' to the pointed lower end 78. This grinding tool 77 may be advantageous where the ground surrounding the stump "S" is difficult to penetrate because of rocks or other soil conditions.

Figure 9:
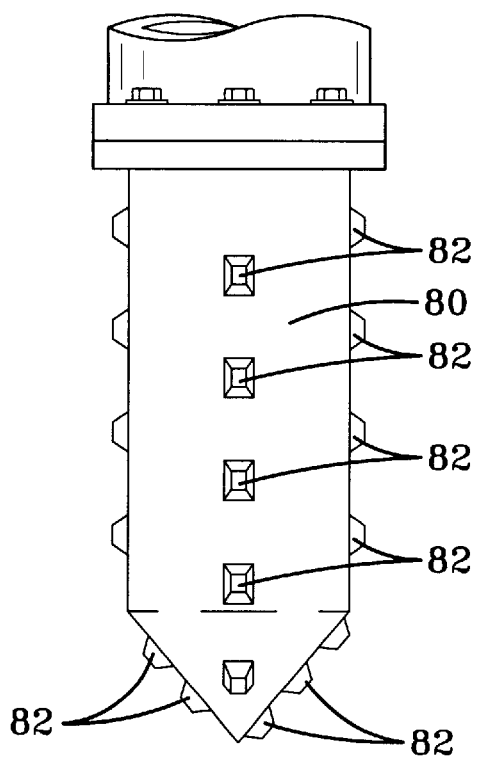
Figure 10:
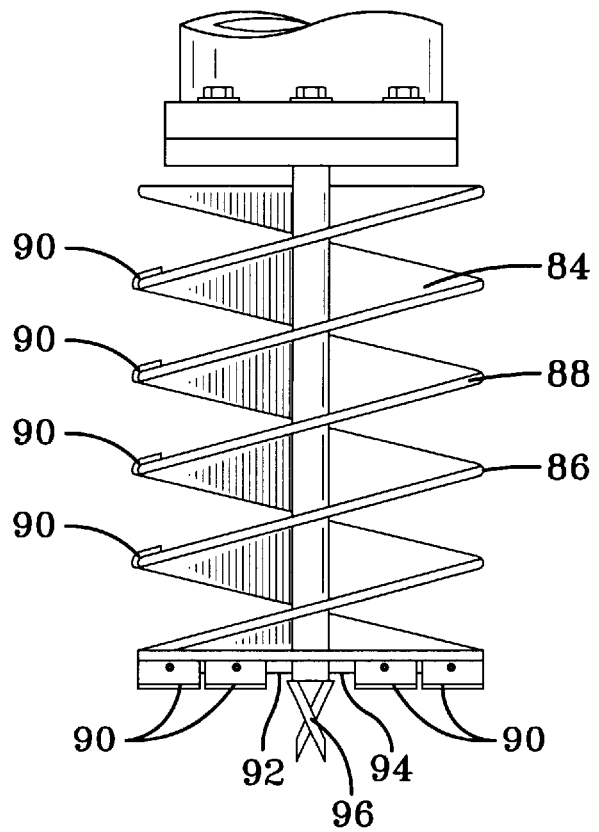

A still further modified grinding tool 80 is shown in FIG. 9 where the teeth 82 are positioned in a spiral pattern and have a generally helical shape for urging the debris from grinding upward to a position at the surface of the ground. Where the ground is very hard an auger-type grinding tool 84 shown in FIG. 10 may be desirable. This tool 84 has an auger shape with helical edges 86 and 88 for lifting the debris out of the ground. Also carbide teeth 90 are mounted on the helical edges 86, 88 as well as on bottom edges 92 and 94. A centering prong 96 may be mounted on the bottom of the tool 80.

While certain representative embodiments and details have been shown for the purpose of illustrating the invention it will be apparent those skilled in the art that various changes and modifications may be made therein without departing from the scope of the invention.

What is claimed is:

1. A stump grinding apparatus comprising
   (a) a grinding tool support member;
   (b) an elongated grinding tool mounted on said support member for rotation about a generally vertical axis of rotation;
   (c) power means mounted on said support member and connected to said grinding tool for rotating said grinding tool;
   (d) cutting teeth mounted on a stump grinding surface of said grinding tool;
   (e) means to lower said support member and drive said rotating grinding tool into the ground at a position adjacent said stump;
   (f) means to move said supporting member in a generally horizontal direction toward said stump to urge said rotating grinding tool and said cutting teeth of said stump grinding surface into a side of said stump and throw the debris horizontally underground;
   (g) means to oscillate and curl said supporting member to move said grinding tool stump grinding surface along the buried surfaces of said stump to grind away said stump; and
   (h) means to raise said support member to remove said grinding tool from the ground.

2. The stump grinding apparatus in accordance with claim 1 further comprising said grinding tool having a generally cylindrical shape to facilitate driving said grinding tool into the ground adjacent the stump and for rotating said grinding tool in the ground.

3. The stump grinding apparatus according to claim 2 wherein said grinding tool has a conical end portion for penetrating the ground.

4. The stump grinding apparatus according to claim 2 wherein said grinding surface is tapered with a "L/D" length divided by diameter ratio in the range of 1.33 to 4.50.

5. The stump grinding apparatus according to claim 2 wherein said grinding tool is in the shape of a frustum of a cone.

6. The stump grinding apparatus according to claim 1 wherein said power means is a hydraulic motor for connection to a source of hydraulic fluid under pressure.

7. The stump grinding apparatus according to claim 1 further comprising a cutting flange mounted on the upper end of said grinding tool for cutting brush.

8. The stump grinding apparatus of claim 1 further comprising said support member being mounted on a vehicle having said means to raise and lower said support member, said means to move said support member in a generally horizontal direction, and said means to oscillate and curl said support member.

9. The stump grinding apparatus according to claim 8 wherein said vehicle is a skid steer loader, said support member is mounted on a bucket beam, said bucket beam is mounted on bucket booms having pivotal connections to said vehicle, said bucket booms being moveable vertically by bucket boom piston cylinder assemblies, said bucket beam being moveable transversally by rotating wheels on one side of said vehicle in the opposite direction to rotation of wheels on the other side and said bucket beam being moveable in a curling motion by actuating a bucket beam piston cylinder assembly.

10. The stump grinding apparatus according to claim 8 wherein said vehicle is a hydraulic excavator and said front plate is a quick coupling connector mounted on a stick member, said stick member is pivotally mounted on a boom, said boom being pivotally mounted on an excavator platform, said platform being rotatable about a generally vertical axis and said quick coupling connector being moveable vertically by a first hydraulic piston cylinder and being moveable transversely by rotation of said excavator platform and said first plate being moveable in a curling action by a third hydraulic cylinder assembly positioned between said quick coupling connector and said stick.

11. The stump grinding apparatus of claim 1 further comprising said grinding tool having a conical pointed end for penetrating the ground.

12. The stump grinding apparatus of claim 1 further comprising said grinding tool being conical in shape.

13. The stump grinding apparatus of claim 2 further comprising said cutting teeth being positioned on said cylindrical shaped stump grinding surface in a spiral pattern and having a generally helical shape for facilitating penetration of the ground adjacent said stump and for lifting said debris out of the ground.

14. The stump grinding apparatus of claim 1 further comprising said grinding tool having the shape of an auger having helical edges and bottom edges, and said carbide teeth being mounted on said helical and bottom edges.

15. A method of grinding a tree stump underground with an elongated generally cylindrical rotatable grinding tool having cutting blades on the generally cylindrical stump grinding surface of said tool comprising:
   (a) supporting an upper end of said grinding tool on a supporting member for rotation about a vertical axis,
   (b) rotating said grinding tool by power means connected to an upper end of said grinding tool,
   (c) lowering said grinding tool into the ground at a position adjacent said stump for penetrating the ground to a depth adjacent the roots of said stump,
   (d) moving said grinding tool towards said stump to engage the sides of said stump,
   (e) traversing said grinding tool along the sides of said stump to grind away portions thereof,
   (f) raising said grinding tool out of the ground after the stump is ground away, and
   (g) stopping the rotation of said grinding tool.

* * * * *